US006453629B1

(12) United States Patent
Nakazima et al.

(10) Patent No.: US 6,453,629 B1
(45) Date of Patent: Sep. 24, 2002

(54) ROOFING TILE HAVING PHOTOVOLTAIC MODULE TO GENERATE POWER

(75) Inventors: Ichiro Nakazima, Nara; Teruki Hatsukaiwa, Otsu; Fumihiro Tanigawa, Settsu; Takuji Nomura, Otsu; Isao Yoshida; Kazuhito Hirai, both of Tokushima, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/620,688

(22) Filed: Jul. 20, 2000

(30) Foreign Application Priority Data

Jul. 21, 1999 (JP) .......................... 11-206205
Aug. 9, 1999 (JP) .......................... 11-225180
Dec. 20, 1999 (JP) .......................... 11-361155

(51) Int. Cl.$^7$ ................................ F24J 2/36
(52) U.S. Cl. ................ 52/173.3; 136/248; 136/251; 136/256
(58) Field of Search .................... 52/173.3; 136/243, 136/244, 251, 252, 248, 256

(56) References Cited

U.S. PATENT DOCUMENTS

| 4,373,308 | A | * | 2/1983 | Whittaker | 52/173.3 |
| 4,466,424 | A | * | 8/1984 | Lockwood | 52/173.3 |
| 5,112,408 | A | * | 5/1992 | Melchior | 52/173.3 |
| 5,482,569 | A | * | 1/1996 | Ihara | 136/244 |
| 5,768,831 | A | * | 6/1998 | Melchior | 52/173.3 |
| 5,849,107 | A | * | 12/1998 | Itoyama | 52/173.3 |
| 5,986,203 | A | * | 11/1999 | Hanoka | 52/173.3 |
| 6,105,316 | A | * | 8/2000 | Bottger | 52/173.3 |
| 6,111,189 | A | * | 8/2000 | Garvison | 136/244 |
| 6,222,115 | B1 | * | 4/2001 | Nakanishi | 136/244 |
| 6,242,685 | B1 | * | 6/2001 | Mizukami | 136/244 |
| 6,294,724 | B1 | * | 9/2001 | Sasaoka | 136/244 |

FOREIGN PATENT DOCUMENTS

| JP | 10-088741 | 4/1998 |
| JP | 10-115051 | 5/1998 |
| JP | 10-317592 | 12/1998 |
| JP | 10-325216 | 12/1998 |
| JP | 11-001999 | 1/1999 |

OTHER PUBLICATIONS

Japanese Utility Model Application KOKAI Publication No. 62–52610 published on Apr. 1, 1987.
Japanese Utility Model Application KOKAI Publication No. 1–148417 published on Oct. 13, 1989.
Japanese Utility Model Application KOKAI Publication No. 4–28524 published on Mar. 6, 1992.
Japanese Utility Model Application KOKAI Publication No. 5–3430 published on Jan. 19, 1993.

* cited by examiner

Primary Examiner—Beth A. Stephan
(74) Attorney, Agent, or Firm—Hogan & Hartson, LLP

(57) ABSTRACT

A roofing tile for performing solar-light power generation includes a roofing tile main body set tilted on a roof, and a photovoltaic module fixed to the main body. The roofing tile main body has a recess open upward. The photovoltaic module is stored and fixed in the recess. The roofing tile main body has an eaves-side edge portion. This edge portion has a plurality of drain ditches. Each drain ditch crosses the upper portion of the eaves-side edge portion and communicates with the recess. The level of the bottom surface of each drain ditch is equal to or lower than that of the bottom surface of the recess. With this construction, rainwater that has entered the recess is discharged through the drain ditches. Rainwater is drained by running the rainwater downward on the upper surface side of the eaves-side edge portion along the tilt direction of the roofing tile.

16 Claims, 11 Drawing Sheets

ROOFING TILE HAVING PHOTOVOLTAIC MODULE TO GENERATE POWER

CROSS-REFERENCE TO RELATED APPLICATIONS

This application is based upon and claims the benefit of priority from the prior Japanese Patent Applications No. 11-206205, filed Jul. 21, 1999; No. 11-225180, filed Aug. 9, 1999; and No. 11-361155, filed Dec. 20, 1999, the entire contents of which are incorporated herein by-reference.

BACKGROUND OF THE INVENTION

The present invention relates to a roofing tile used as a roofing material for a building and, more particularly, to a roofing tile having a photovoltaic module for solar-light power generation.

A photovoltaic module for converting solar-light energy into electrical energy is known. A technique of using such a module mounted on a roofing tile used as roofing material for a building is disclosed in, e.g., Jpn. Pat. Appln. KOKAI Publication Nos. 10-88741, 10-115051, and 10-325216.

A photovoltaic module is fixed on a roofing tile main body by the following method. As the first fixing form, a photovoltaic module is directly bonded to the roofing tile main body with an adhesive. The second fixing form is disclosed in Jpn. Pat. Appln. KOKAI Publication No. 11-1999: a roofing tile main body having a recess is used, a photovoltaic module is bonded to the bottom surface of the recess with an adhesive, and the gap between the photovoltaic module and the inner peripheral surface of the recess is filled with a caulking material.

However, an adhesive or caulking material readily degrades. The adhesive or caulking material rapidly degrades especially in, e.g., a rooftop environment where it is exposed to sunbeams and increases its temperature, or open to wind and rain. If the adhesive or caulking material degrades to form cracks, rainwater or dust may enter the gap between the roofing tile main body and the photovoltaic module through the cracks.

Jpn. Pat. Appln. KOKAI Publication No. 10-88741 discloses an arrangement in which a photovoltaic module is stored in a recess of a plain roofing tile, and a through hole communicating with the reverse side of the roofing tile is formed at the eaves-side edge of the plain roofing tile. Generally, of roofing tiles adjacent in the eaves-ridge direction of a roof, the ridge-side roofing tile has its eaves-side edge portion overlapping the ridge-side edge portion of the eaves-side roofing tile. For this reason, rainwater that has entered the recess of the ridge-side roofing tile is discharged to the reverse side of the roofing tile through the through hole, is received by the eaves-side roofing tile, and runs in the eaves direction along the slope of the eaves-side roofing tile.

The gap between the edge portions of the roofing tiles adjacent in the eaves-ridge direction is sometimes jammed with dust or the like. In this case, it is difficult for the roofing tile disclosed in Jpn. Pat. Appln. KOKAI Publication No. 10-88741 to discharge rainwater that has been discharged to the lower side of the roofing tile in the eaves direction. Accordingly, the water may be discharged to the attic side. Hence, the reliability of drainage to the eaves side is poor.

If the through hole is jammed with dust or the like, it is hard to discharge rainwater that has entered the recess to the lower side of the roofing tile main body. When the photovoltaic module has a terminal box on its lower surface, the terminal box is exposed to the rainwater in the recess. This may cause corrosion of the terminal box or failures such as short circuit and earth leakage at the connection portion between the terminal box and an output cable extracted from the terminal box.

In the roofing tile disclosed in Jpn. Pat. Appln. KOKAI Publication No. 10-115051, a photovoltaic module is stored in a recess. The upper surface of the eaves-side edge portion of this roofing tile is formed to be flush with that of the photovoltaic module almost without forming any step therebetween. At the left and right edge portions, the upper surface of the roofing tile projects from that of the photovoltaic module. This prior art describes the arrangement for making rainwater smoothly run on the surface of the roofing tile, though discharge of rainwater that has entered the recess of the roofing tile is not mentioned.

In the roofing tile disclosed in. Pat. Appln. KOKAI Publication No. 10-325216, a photovoltaic module is stored in a recess. The upper surface of the eaves-side edge portion of this roofing tile is formed to be flush with that of the photovoltaic module almost without forming any step therebetween. At one of the left and right edge portions, the upper surface of the roofing tile projects from that of the photovoltaic module. This prior art describes the arrangement for making rainwater smoothly run on the surface of the roofing tile, though discharge of rainwater that has entered the recess of the roofing tile is not mentioned.

Jpn. UM Appln. KOKAI Publication Nos. 62-52610, 1-148417, 4-28524, and 5-3430 disclose techniques of bonding a photovoltaic module to a roofing tile main body and doing waterproof treatment for the peripheral portion of the bonded photovoltaic module using a caulking material. The caulking material fills the gap between the peripheral portion of the photovoltaic module and the inner peripheral surface of the recess of the roofing tile main body in which the module is stored.

In the roofing tile disclosed in each of these prior-art techniques, since the roofing tile main body and photovoltaic module are bonded, the roofing tile main body and photovoltaic module can hardly be separated. For a number of roofing tiles placed on a roof for solar-light power generation, a certain photovoltaic module may require exchange. In this case, only the photovoltaic module requiring exchange cannot be exchanged, and the roofing tile main body itself must be exchanged. This involves difficult operation of temporarily detaching several roofing tiles around the roofing tile to be exchanged.

Jpn. Pat. Appln. KOKAI Publication No. 10-317592 discloses a technique of setting a roofing tile for solar-light power generation (a roofing tile with photovoltaic) using a fixing metal fitting having a clamp portion projecting from a substrate. The fixing metal fitting is fixed at the ridge-side edge portion of the roofing tile. To lap the sheathing roof board with the roofing tile by tile-roofing, the clamp portion of the fixing metal fitting is bent. The bent clamp portion clamps the eaves-side edge portion of the ridge-side roofing tile. However, the roofing tile disclosed in this prior art must be placed while bending the clamp portion of the fixing metal fitting during tile-roofing operation. Hence, laying is cumbersome, and it is difficult to firmly fix the roofing tile only by bending the clamp portion.

BRIEF SUMMARY OF THE INVENTION

It is the first object of the present invention to obtain a roofing tile having a photovoltaic module to generate power, which can discharge rainwater that has entered the recess where the photovoltaic module is stored to the eaves side at improved reliability.

It is the second object of the present invention to obtain a roofing tile having a photovoltaic module to generate power, which can satisfactorily discharge rainwater that has entered the recess, in addition to the first object.

It is the third object of the present invention to obtain a roofing tile having a photovoltaic module to generate power, which can suppress adverse influence on the terminal box of the photovoltaic module due to rainwater that has entered the recess, in addition to the first object of the present invention.

It is the fourth object of the present invention to obtain a roofing tile having a photovoltaic module to generate power, which can easily exchange a photovoltaic module which requires exchange and also can firmly fix the photovoltaic module to the roofing tile main body.

In order to achieve the first object, according to claim 1 of the present invention, there is provided a roofing tile having a photovoltaic module to generate power, which has, at the eaves-side edge portion of a roofing tile main body set tilted on a roof, at least one water discharge portion crossing the eaves-side edge portion and communicating with a recess of the roofing tile main body, in which the photovoltaic module is stored.

In the present invention, the roofing tile main body is formed from an inorganic material such as clay, synthesis resin material, or cement, a metal material, or a composite material thereof. For the photovoltaic module, a structure can be used, in which a transparent electrode layer, a semiconductor layer for performing photoelectric conversion, and a back electrode layer are sequentially stacked, by a thin-film forming technology, on the back surface of a substrate formed from a transparent insulating material such as a transparent glass plate or transparent synthetic resin, and a protective film is coated on the lower surface. The protective layer is used for insulating, waterproofing, and mechanical protection of the layer covered with the protective layer. As the semiconductor layer, an amorphous semiconductor layer can be preferably used. However, the present invention is not limited to this, and a semiconductor layer formed from a single crystal, polycrystalline, or crystallite may be used. In addition, an Si- or compound-based material may be used. Alternatively, a tandem-type photovoltaic module may be used.

The present invention incorporates that the water discharge portion is formed from a ditch. The present invention incorporates that the drain ditch communicates with lower corner portions of the recess. The present invention incorporates that a level of a bottom surface of the drain ditch is not more than that of a bottom surface of the recess.

The present invention also incorporates that the water discharge portion is formed from a tunnel-like passage. The present invention incorporates that the roofing tile further comprises a sealing material continuously provided around the recess to bond a peripheral portion of the photovoltaic module to the recess, and the passage is formed between the water discharge portion and a portion of the sealing material that crosses the water discharge portion. The present invention also incorporates that the passage is formed from an inner hollow of a pipe having two open ends, the pipe being arranged between the sealing material and the water discharge portion. The present invention incorporates that the roofing tile further comprises a catchment ditch having a lower ditch portion extending in a widthwise direction of the roofing tile main body, the lower ditch portion communicating with the passage. The present invention incorporates that the catchment ditch has a pair of side ditch portions connected to two ends of the ditch portion and extending in a ridge-side edge direction of the roofing tile main body.

According to the arrangement of the present invention, rainwater or the like that has entered the recess is discharged in the eaves direction through the water discharge portion crossing the eaves-side edge portion of the roofing tile main body. In this case, the gap between roofing tiles adjacent and overlapping in the eaves-ridge direction is not used as a drainage-way. For this reason, even when the gap is jammed with dust, drainage is not impeded. Hence, the reliability of discharge of rainwater that has entered the recess in the eaves direction improves. In addition, the rainwater that has entered the recess is not discharged to the attic side.

In order to achieve the second object, according to claim 3 of the present invention, there is provided a roofing tile having a photovoltaic module to generate power, characterized in that the eaves-side edge portion has a pair of stopper portions holding lower corner portions of the photovoltaic module, the drain ditch is formed between the stopper portions, and the single drain ditch has a length slightly smaller than a widthwise size of the recess. In order to achieve the second object, according to claim 4 of the present invention, there is provided a roofing tile having a photovoltaic module to generate power, characterized in that the drain ditch is formed from a single ditch, a width of the drain ditch is not less than a widthwise size of the recess, and the recess and the drain ditch are continuous.

According to the arrangement of this present invention, since the single drain ditch is formed widely to extend in the lateral direction of the roofing tile main body, the drain ditch is not jammed with dust. For this reason, the discharge performance for rainwater that has entered the recess in the eaves direction is maintained for a long time.

In order to achieve the third object, according to claim 15 of the present invention, there is provided a roofing tile having a photovoltaic module to generate power, characterized in that the photovoltaic module has, on a reverse surface, a terminal box for extracting a power output from the module, and the roofing tile further comprises a terminal box storing recess formed on a bottom wall of the recess to store the box.

According to the arrangement of this invention, since rainwater that has entered the recess is discharged in the eaves direction through the water discharge portion crossing the eaves-side edge portion of the roofing tile main body, the rainwater that has entered the recess hardly stays in the terminal box storing recess which stores the terminal box. For this reason, the terminal box can be suppressed from being exposed to rainwater in the storing recess.

In order to achieve the fourth object, according to claim 12 of the present invention, there is provided a roofing tile having a photovoltaic module to generate power, characterized by comprising, at the eaves-side edge portion of a roofing tile main body set tilted on a roof, at least one water discharge portion crossing the eaves-side edge portion and communicating with a recess of the roofing tile main body, in which the photovoltaic module is stored, wherein the photovoltaic module is fixed to the roofing tile main body through a fixing jig and nut. The fixing jig has a first end portion having a bent piece overlapping an upper surface of an edge portion of the photovoltaic module and holding the edge portion of the module, and a second end portion to which a bolt extending through the through hole is fixed. The fixing jig is fixed to the roofing tile main body by tightening the detachable nut on the bolt on the reverse side of the roofing tile main body.

The present invention incorporate that the first end portion is holding an eaves-side edge portion of the photovoltaic module. The present invention also incorporates that a levee is formed on the bottom surface of the recess so as to continuously surround a ridge side and left and right sides of the through hole.

According to the arrangement of this invention, when the nut is tightened, the photovoltaic module is pressed against the recess of the roofing tile main body through the fixing jig, and fixed to the roofing tile main body. When the nut is loosened and detached, the photovoltaic module and fixing jig can be detached from the roofing tile main body. Hence, the standalone photovoltaic module can be exchanged. In addition, according to the arrangement having the levee, rainwater that has entered the recess can be prevented by the levee from running into the through hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will be described below with reference to FIGS. 1 to 5.

Figure 4:
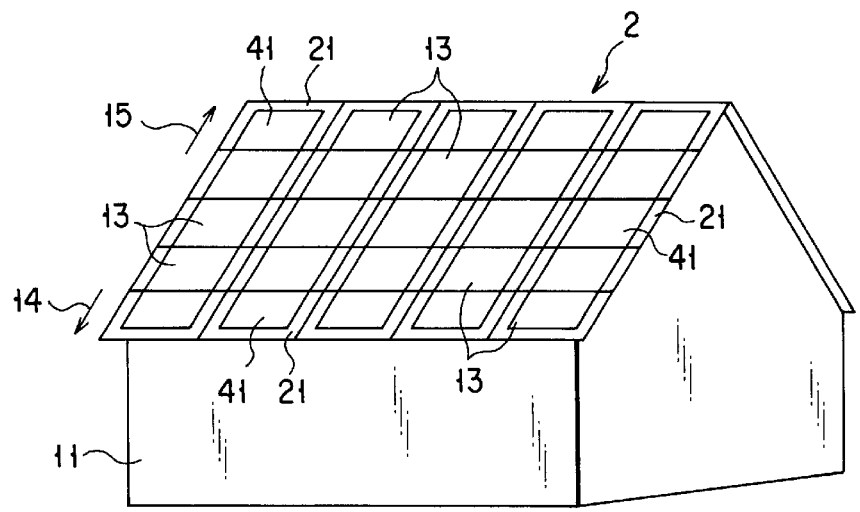
FIG. 4 is a perspective view schematically showing a building having a roof covered with the roofing tiles according he first embodiment.
Figure 5:
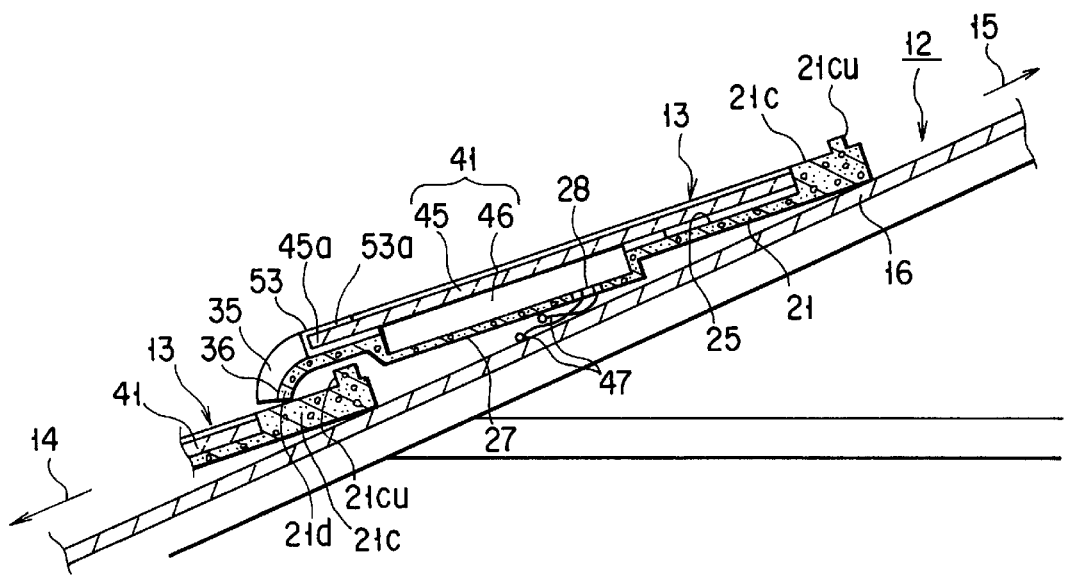
FIG. 5 is a sectional view showing part of the roof of the being shown in FIG. 4.
Figure 6:
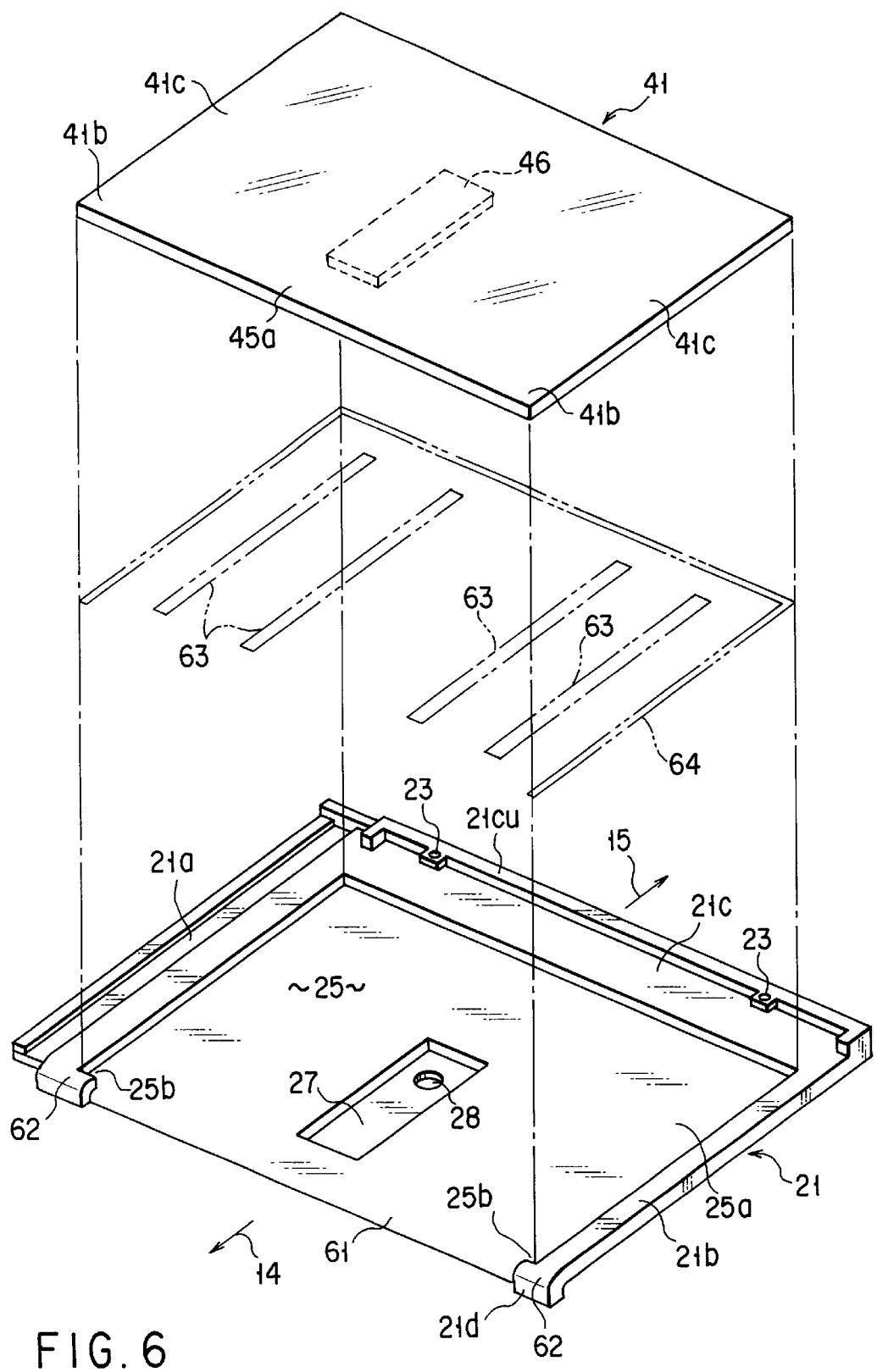
FIG 6 is an exploded perspective view showing a roofing tile according to the second embodiment of the present invention.
Figure 7:
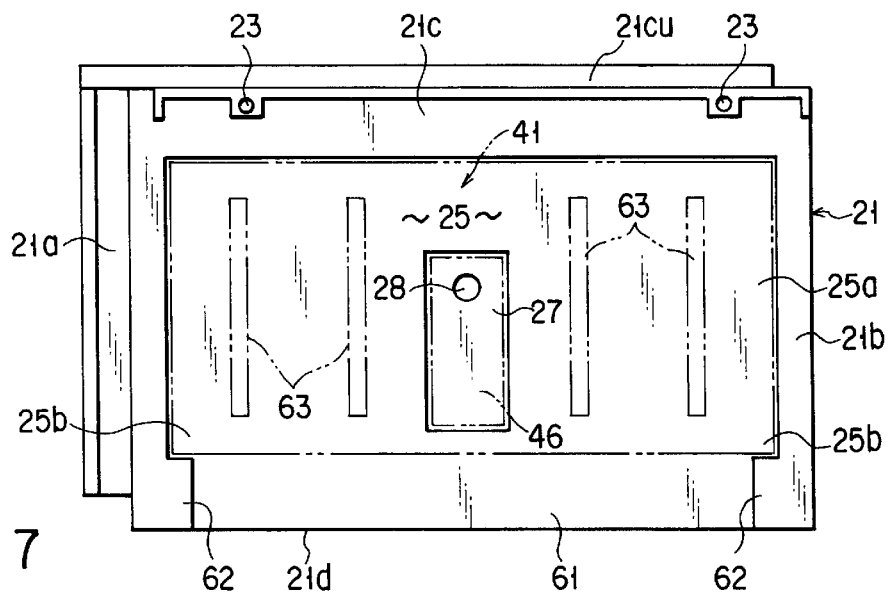
FIG. 7 is a plan view showing the roofing tile main body of the roofing tile according to the second embodiment.
Figure 8:
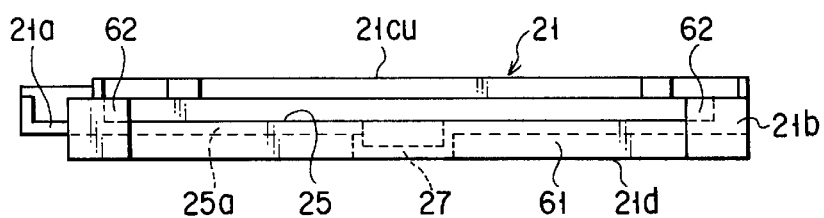
FIG. 8 is a front view of the roofing tile according to the second embodiment.
Figure 9:
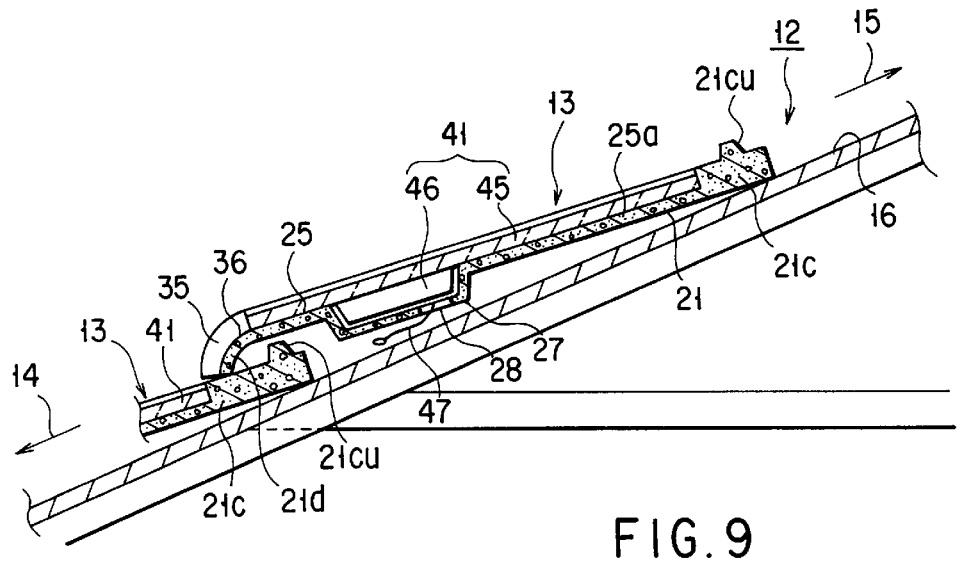
FIG. 9 is a sectional view showing part of the roof of a build; roofed with the roofing tile according the second embodiment.

FIG. 4 is a perspective view schematically showing a building having a roof covered with roofing tiles according to the first embodiment. A roof 12 of a building 11 has a number of roofing tile 13 as a roofing material. The roofing tiles 13 are arranged in order in the vertical and horizontal directions. Each roofing tile 13 obtains electrical energy by solar-light power generation. An arrow 14 in FIGS. 1, 4, and 5 indicates the eaves direction, and an arrow 15 indicates the ridge direction. Referring to FIG. 5, reference numeral 16 denotes a sheathing roof board of the roof 12, which tilts downward from the ridge side to the eaves side of the roof 12.

Figure 1:
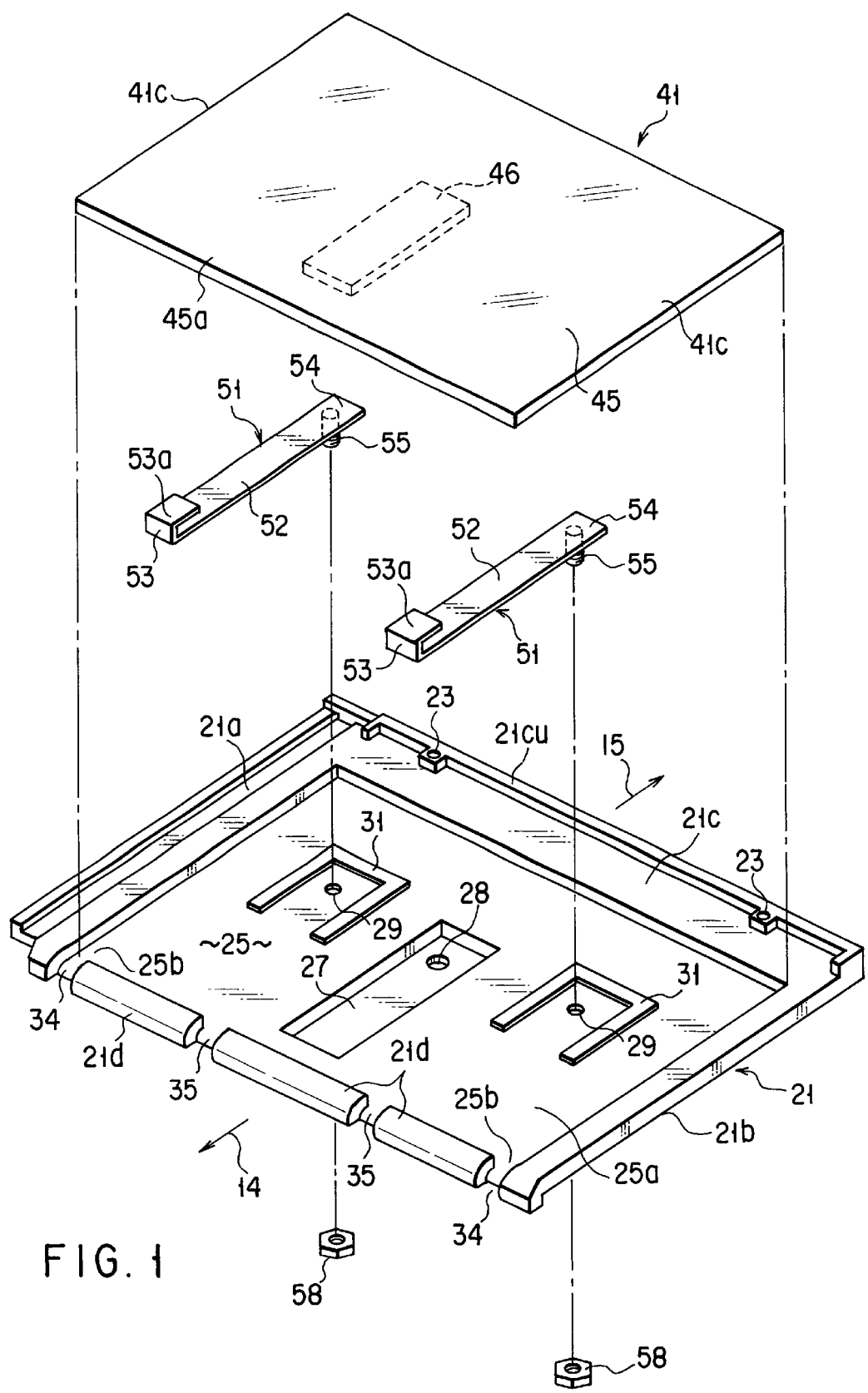
FIG. 1 is an exploded perspective view showing a roofing tile according to the first embodiment of the present invention.
Figure 3:
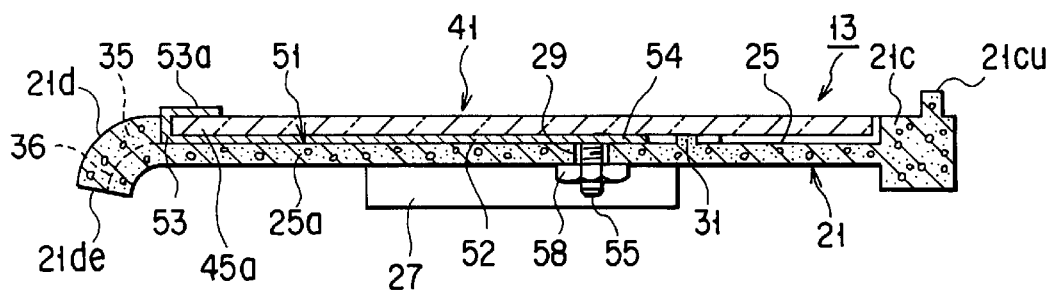
FIG. 3 is a sectional view of the roofing tile according to the first embodiment.

As shown in FIGS. 1 and 3, each roofing tile 13 has a roofing tile main body 21, photovoltaic module 41, a plurality of, e.g., two fixing jigs 51, and nuts 58 equal in number to the jigs 51.

Figure 2:
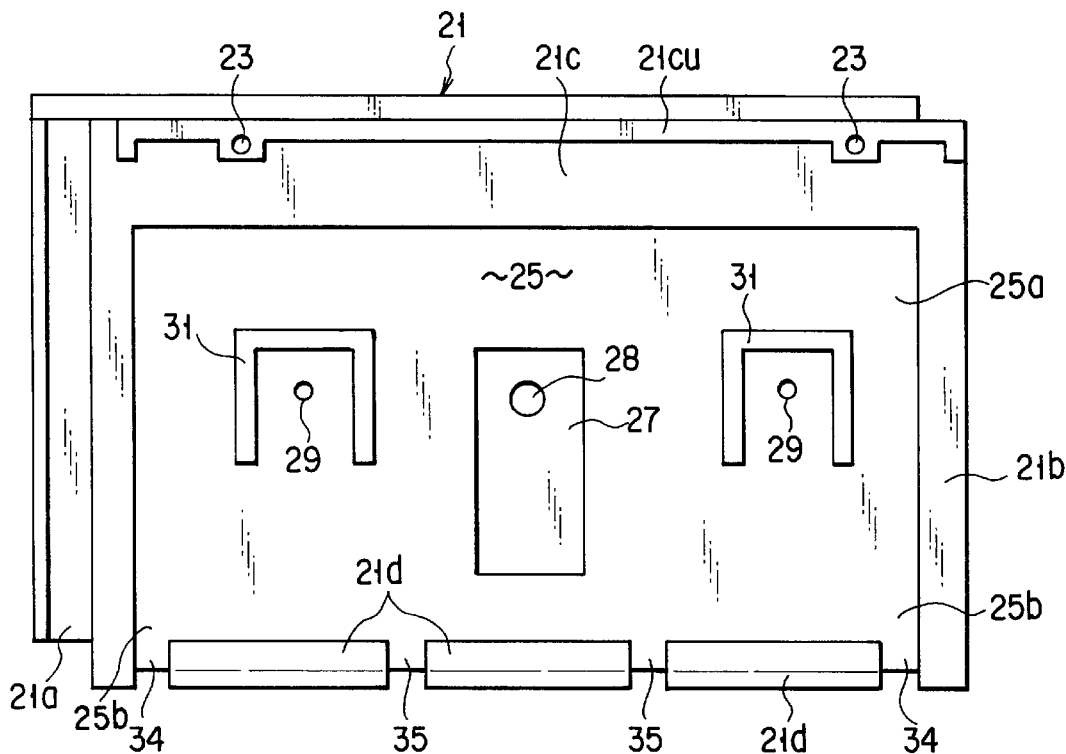
FIG. 2 is a plan view showing the roofing tile main body of the roofing tile according to the first embodiment.

As shown in FIGS. 1 and 2, the roofing tile main body 21 is formed from, e.g., cement into an almost rectangle flat plate. The roofing tile main body 21 has, at its two side portions in the width direction, overlap portions 21a and 21b as left and right side portions. The overlap portions 21a and 21b engage with the overlap portions of adjacent roofing tile main bodies 21 on the left and right sides on the roof 12. An upper edge portion 21c as the ridge-side edge portion of the roofing tile main body 21 has an upright portion 21cu. The lower edge portion as the eaves-side edge portion of the roofing tile main body 21 forms a front hang portion 21d. As shown in FIG. 3, the front hang portion 21d is bent downward. The overlap portions 21a and 21b and upper edge portion 21c continue. In this embodiment, the overlap portions 21a and 21b and front hang portion 21d do not continue.

As shown in FIG. 5, the roofing tile main bodies 21 adjacent in the vertical direction (eaves-ridge direction) continuously overlap on the roof 12. More specifically, the front hang portion 21d of the ridge-side roofing tile main body 21 relatively located on the upstream side overlaps the upper surface of the upper edge portion 21c of the eaves-side roofing tile main body 21 relatively located on the downstream side. Each roofing tile main body 21 is placed on the sheathing roof board 16 directly or via an underlying roofing material such as roofing (not shown). Referring to FIGS. 1 and 2, reference numerals 23 denote fixing holes each of which receives a tile attachment component such as a nail or screw to fix the roofing tile main body 21.

The roofing tile main body 21 has a rectangular recess 25 open upward. The recess 25 has a size corresponding to the most part of the roofing tile main body 21. The recess 25 is surrounded by the edge portions of the roofing tile main body 21, i.e., the overlap portions 21a and 21b, upper edge portion 21c, and front hang portion 21d. The depth of the recess 25 is slightly larger than the thickness of the photovoltaic module 41.

The recess 25 has a terminal box storing recess 27 at the central portion in the width direction of a bottom wall 25a. This storing recess 27 has a rectangular planar shape and extends in the eaves-ridge direction. The reverse surface of the terminal box storing recess 27 is almost flush with the front hang portion 21d of the roofing tile main body 21. Thus, the roofing tile main body 21 is stably placed on the roof 12.

A cable leading hole 28 is formed in the bottom plate portion of the terminal box storing recess 27. The leading hole 28 is located on the upper side of the intermediate point of the recess 25 in the eaves-ridge direction. Hence, the cable leading hole 28 is located on the upper side of the recess 25, i.e., on the ridge side.

As shown in FIGS. 1 and 2, the bottom wall 25a of the recess 25 has at least one and, for example, a pair of through holes 29 extending through itself. These holes 29 are formed on both sides of the terminal box storing recess 27. The through holes 29 are preferably formed on the ridge side of the recess 25, like the cable leading hole 28. With this arrangement, even if the mount of rainwater entering the recess 25 is larger than the discharge amount from the recess 25 through drain ditches (to be described later), the water level in the recess 25 can be prevented from reaching the through holes 29.

Levees 31 are integrally formed near the through holes 29 on the upper surface of the bottom wall 25a of the recess 25. Each levee 31 continuously surrounds a corresponding through hole 29 on its upper (ridge) side, and left and right sides. The levees 31 are open on the eaves side. The levees 31 prevent rainwater that has entered the recess 25 from reaching the through holes 29. For this reason, rainwater leakage to the reverse side of the roofing tile main body 21 can be prevented.

As shown in FIGS. 1 and 2, the front hang portion 21d of the roofing tile main body 21 has a pair of first drain ditches 34 and a pair of second drain ditches 35, each of which serves as a water discharge portion. Rainwater that has entered the recess 25 is discharged to the eaves side through the drain ditches 34 and 35. The pair of first drain ditches 34 cross, in the eaves-ridge direction, the upper side portion of the front hang portion 21d at its two longitudinal-direction end portions, thereby separating the overlap portions 21a and 21b from the upper side portion of the front hang portion 21d. The pair of second drain ditches 35 cross, in the eaves-ridge direction, the upper side portion of the front hang portion 21d at its longitudinal-direction intermediate portion, thereby dividing the upper side portion of the front hang portion 21d into a plurality of parts.

The ridge-side ends of the two first drain ditches 34 communicate with lower corner portions 25b of the recess 25. The ridge-side ends of the two second drain ditches 35 communicate with the widthwise-direction intermediate portion of the recess 25. These drain ditches 34 and 35 are formed along the curve of the front hang portion 21d and open to the upper surface of the front hang portion 21d. The eaves-side ends of the drain ditches 34 and 35 reach an end face 21de of the front hang portion 21d and are open.

Bottom surfaces 36 (represented by FIG. 3) of the drain ditches 34 and 35 are lower than the bottom surface of the recess 25, i.e., the upper surface of the bottom wall 25a. In this embodiment, the bottom surfaces 36 are curved. The upper portions of the bottom surfaces 36 continue to the upper surface of the bottom wall 25a almost without forming any step, and the bottom surfaces 36 gradually lower toward the end face 21de.

In the present invention, instead of curving the bottom surface 36, it may have a step lower then the upper surface of the bottom wall 25a. The bottom surface 36 may be flush with the upper surface of the bottom wall 25a. The bottom surface 36 may tilt downward from the upper surface of the bottom wall 25a. Hence, in the present invention, the eaves-side ends of the drain ditches 34 and 35 are open to the eaves-side surface of the front hang portion 21d in the eaves direction without reaching the end face 2lde.

The recess 25 of the roofing tile main body 21 has a size suitable to the size of the photovoltaic module 41. The photovoltaic module 41 is stored in the recess 25 and fixed as will be described later.

The photovoltaic module 41 shown in FIG. 1 has a rectangular module main body 45 and terminal box 46. The surface of the module main body 45 serves as a light incident surface. The terminal box 46 is bonded to at almost the widthwise-direction central portion of the reverse surface of the module main body 45. As shown in FIG. 5, an output cable 47 is extracted from the terminal box 46.

The module main body 45 has a thin panel-like shape and comprises a transparent substrate made of glass, a plurality of amorphous silicon cells serving as a semiconductor layer, a pair of positive and negative electrodes, a pair of output extraction lines, and a protective layer (none are shown). The cells are formed on the reverse surface of the transparent substrate and connected in series for solar heat power generation by photoelectric conversion. The positive and negative electrodes are arranged on both sides of the cell group and electrically connected to the cell group. The pair of output extraction lines electrically connect the positive and negative electrodes to the terminal box. The protective layer has a filling material which is stacked on the lower side of the transparent substrate and seals the greater part of the output extraction lines, the cells, and the electrodes, and a protective sheet adhered to the filling material.

The cells and electrodes extend parallel to each other and in the eaves-ridge direction of the roof 12. The output extraction lines are perpendicularly connected to the electrodes and extend in the widthwise direction of the module main body 45. The distal end portions of the output extraction lines are bent toward the reverse side, extend through the protective layer, and are connected, in the terminal box 46, to terminal metal fittings (not shown) of the box 46.

As shown in FIGS. 1 and 3, the photovoltaic module 41 is fixed in the recess 25 of the roofing tile main body 21 using the fixing jigs 51 and nuts 58. Each fixing jig 51 is mainly formed from, e.g., a long metal plate 52 and has a first end portion 53 and second end portion 54.

The first end portion 53 is formed by bending one end portion of the metal plate 52 upward and then toward the second end portion 54. A bent piece 53a bent to the second end portion 54 side is almost parallel to the metal plate 52. The bent piece 53a is stacked on the upper surface of the edge portion of the module main body 45. The edge portion of the module main body 45 can be inserted/removed into/from the inner space surrounded by the first end portion 53.

One bolt 55 is welded to the lower surface of the second end portion 54. The bolt 55 need not always be fixed to the metal plate 52 by welding. For example, the bolt 55 may be inserted into a hole formed in the metal plate 52 and fixed by arranging nuts (not shown) on the upper and lower sides of the metal plate 52 and threadably engaging them with the bolt 55. When the bolt 55 is fixed by welding, it can be fixed without making itself and a nut project from the upper surface of the metal plate 52. This structure is advantageous because the bolt and the like can be prevented from locally abutting against the reverse surface of the module main body 45 and exerting a load on the module main body 45. The bolts 55 can project to the reverse side of the bottom wall 25a of the recess 25 through the through holes 29.

A plurality of bolts 55, e.g., two bolts 55 may be used in accordance with the size of the module main body 45. In this case, one bolt 55 is fixed to the second end portion 54, and the other bolt 55 can be fixed to an arbitrary portion. In this arrangement, the number of through holes 29 of the recess 25 is also increased.

Each fixing jig 51 is arranged on the reverse side of the module main body 45 while holding the first end portion 53 on a lower edge portion 45a of the main body 45. The assembly of the fixing jigs 51 and photovoltaic module 41 is stored in the recess 25. To store the assembly, the bolt 55 of each fixing jig 51 is inserted into a corresponding one of the through holes 29. On the reverse side of the roofing tile main body 21, the nuts 58 threadably engage with the bolts 55 extending through the through holes 29, respectively. When the nuts 58 are tightened, the photovoltaic module 41 stored in the recess 25 is fixed to the roofing tile main body 21. The nuts 58 can be detached from the bolts 55. When the nuts 58 are loosened and detached from the bolts 55, the photovoltaic voltaic module 41 can be easily detached from the roofing tile main body 21.

After tightening the nuts 58, the through holes 29 are sealed using a sealing material (not shown). This sealing is preferable because rainwater that has entered the recess 25 can be prevented from leaking to the reverse side of the roofing tile main body 21. In fixing the photovoltaic module 41, it is preferable to bring the upright portion 53a of the first end portion 53 into contact with the front hang portion 21d of the roofing tile main body 21.

To fix one photovoltaic module 41 to the roofing tile main body 21, at least two fixing jigs 51 need be used. For fixing, each fixing jig 51 is set along the vertical direction of the recess 25 and has its first end portion 53 holding the lower edge portion 45a of the module main body 45. The first end portion 53 that presses the edge portion of the photovoltaic module 41 from the upper side can be used as a stopper for preventing the photovoltaic module 41 from dropping.

The fixing jig 51 may be set along the horizontal direction (widthwise direction) of the recess 25 and have its first end portion 53 holding one side edge portion 41c of the module main body 45. This can be implemented by partially omitting the levee 31, i.e., omitting the portion almost parallel to the side edge portion 41c of the module main body 45. When the fixing jig 51 is arranged in the widthwise direction, its first end portion 53 can be located obliquely on the lower side of a horizontal line passing through the through hole 29. This arrangement is preferable because rainwater can be prevented from reaching the through hole 29 along the fixing jig 51.

When the photovoltaic module 41 is fixed in the recess 25, the terminal box 46 on the reverse surface of the module 41 is stored in the terminal box storing recess 27 of the recess 25. As shown in FIG. 5, the output cable 47 connected to the terminal box 46 is extracted to the reverse side of the roofing tile main body 21 through the cable leading hole 28 of the storing recess 27.

In operation of lapping the roof 12 with the roofing tiles 13 each having the above structure by mounting the roofing tiles 13 on the sheathing roof board 16, the roofing tiles 13 are mounted on the sheathing roof board 16 from the eaves side to the ridge side and fixed on the sheathing roof board 16 by inserting nails or the like into the fixing holes 23, as in the normal tile-roofing operation. In this case, the roofing tiles 13 adjacent in the horizontal direction are continuously arranged by fitting and overlapping the overlap portions 21a and 21b of the roofing tile main bodies 21 to each other. The roofing tiles 13 adjacent in the eaves-ridge direction are continuously arranged by stacking the front hang portion 21d of the roofing tile main body 21 relatively on the ridge side on the upper surface of the upper edge portion 21c of the roofing tile main body 21 relatively on the eaves side, as shown in FIG. 5.

By repeating this operation, the roof 12 is lapped with the roofing tiles 13. Parallel to this tile-roofing operation, the output cables 47 extracted from the terminal boxes 46 are connected in series or in parallel. Thus, a plurality of photovoltaic modules 41 are electrically connected. An output terminal obtained by this connection is connected to a lead-in cable (not shown) led into the building.

In case of rainfall, rainwater hitting the upper surface of the photovoltaic module 41 runs downward on the upper surface of the module 41, continuously on the upper surface of the front hang portion 21d of the roofing tile main body 21, and then to the upper surface of another roofing tile 13 continued on the eaves side. Part of the rainwater poured onto the roofing tile 13 enters the recess 25 through the gaps between the overlap portions 21a and 21b of the roofing tile main body 21 and the side edge portions of the photovoltaic module 41.

The rainwater that has entered the recess 25 runs downward on the bottom surface of the recess 25 and is discharged in the eaves direction through the drain ditches 34 and 35 formed in the front hang portion 21d of the roofing tile main body 21. Thus, the rainwater in the recess 25 is transferred to the upper surface of another roofing tile 13 continued on the eaves side. For this reason, even when the overlap portion between the roofing tile 13 on the eaves side and the roofing tile 13 on the ridge side is jammed with dust or the like, drainage is not impeded because that portion does not serve as a drainage-way.

As described above, the rainwater that has entered the recess 25 runs downward on the upper surface side of the front hang portion 21d along the tilted roofing tile 13 through the drain ditches 34 and 35 located on the upper side of the overlap portion. Hence, the water can be reliably discharged. In addition, the water discharge portion is formed from the drain ditches 34 and 35 each having an upper surface and two end portions open and is hardly jammed with dust or the like, as compared to a hole. This structure can be suitably employed to maintain the above-described drainage performance.

Furthermore, since the rainwater in the recess 25 is discharged to the eaves side without being discharged to the reverse side of the roofing tile main body 21, as described above, the sheathing roof board 16 does not get wet.

Most part of the rainwater that has entered the recess 25 tends to run downward along the overlap portions 21a and 21b along the gaps as inlets and reach the lower corner portions 25b of the recess 25. The pair of first drain ditches 34 of the roofing tile 13 with the above arrangement directly communicate with the lower corner portions 25b of the recess 25. For this reason, the water can be easily discharged through the ditches 34.

With the above drainage, the rainwater can be prevented from running into and staying in the terminal box storing recess 27. For this reason, exposure of the terminal box 46 to the rainwater staying in the storing recess 27 can be suppressed. Accordingly, corrosion of the terminal box 46, or short circuit and earth leakage at the connection portion between the terminal box 46 and the output cable 47 extracted from the terminal box 46 are suppressed. Hence, the durability of the roofing tile 13 improves.

According to the roofing tile 13 having the above structure, the photovoltaic module 41 is fixed to the roofing tile main body 21 using the fixing jigs 51 and nuts 58. Hence, the photovoltaic module 41 is firmly fixed to the roofing tile main body 21, and this fixed state is sustained for a long period. In addition, since the photovoltaic module 41 need not be fixed to the roofing tile main body 21 using an adhesive, the operation of fixing the photovoltaic module 41 to the roofing tile main body 21 is facilitated. When the photovoltaic module 41 is fixed to the roofing tile main body 21 using an adhesive, the photovoltaic module 41 may peel from the roofing tile main body 21 and drop due to degradation in adhesive. However, this problem can be solved by the roofing tile 13 with the above structure.

One or more of photovoltaic modules 41 placed on the roof 12 together with the roofing tile main bodies 21 may be damaged and require exchange. In this case, only the photovoltaic modules 41 which must be exchanged can be exchanged with new photovoltaic modules 41. This is because the fixing jigs 51 and nuts 58 that fix the photovoltaic module 41 to the roofing tile main body 21 can be detached.

When the nuts 58 that fix the photovoltaic module 41 requiring exchange are loosened and detached from the bolts 55 of the fixing jigs 51, the photovoltaic module 41 and fixing jigs 51 can be detached from the roofing tile main body 21. After that, the fixing jigs 51 are removed from the detached photovoltaic module 41, and a new photovoltaic module 41 is set on the jigs 51. The new photovoltaic module 41 is stored in the recess 25 of the roofing tile main body 21 and fixed using the fixing jigs 51 and nuts 58 again. With the above operation, desired photovoltaic modules 41 can be exchanged.

FIGS. 6 to 9 are views showing a roofing tile according to the second embodiment of the present invention. The second embodiment basically has the same arrangement as in the first embodiment. The same reference numerals as in the first embodiment denote the same parts in the second embodiment, and a detailed description of the arrangement and function will be omitted. The different points will be described below. The second embodiment is different from the first embodiment in the drain ditch structure, the means for fixing a photovoltaic module to a roofing tile main body, and the like.

In the second embodiment, a single drain ditch 61 is provided. This drain ditch 61 is formed at a front hang portion 21d to have a length corresponding to nearly the full width of a recess 25. More specifically, the front hang portion 21d has stopper portions 62 at its two longitudinal-direction end portions. The single drain ditch 61 horizontally extends between the pair of stopper portion 62. For this reason, the drain ditch 61 is slightly shorter than the widthwise-direction size of the recess 25. The bottom surface of the drain ditch 61 continues to the bottom surface of the recess 25 essentially without forming any step and is bent downward, as in the first embodiment.

The stopper portions 62 integrally continue to overlap portions 21a and 21b at lower corner portions 25b of the recess 25, respectively. Lower corner portions 41b of a photovoltaic module 41 are hold by the stopper portions 62, respectively. The stopper portions 62 prevent the photovoltaic module 41 stored in the recess 25 from dropping in the eaves direction.

The reverse surface of the photovoltaic module 41 is fixed to the bottom surface of the recess 25 at a plurality of positions via an adhesive 63. As the adhesive 63, an epoxy-, silicone-, or silicon-based adhesive can be used. The obverse (upper surface) of the photovoltaic module 41 fixed to the roofing tile main body 21 is almost flush with the overlap portions 21a and 21b and upper edge portion 21c around the photovoltaic module 41. A waterproofing gasket 64 is inserted between the edge portions of the photovoltaic module 41 and the overlap portions 21a and 21b and upper edge portion 21c.

The photovoltaic module 41 may be fixed to the roofing tile main body 21 using a double adhesive tape instead of the adhesive 63. Alternatively, the photovoltaic module 41 may be fixed to the roofing tile main body 21 using both the double adhesive tape and the adhesive 63.

Except the above-described points, the second embodiment has the same arrangement as that of the first embodiment, including structures not shown in FIGS. 6 to 9.

According to the structure of a roofing tile 13 of the second embodiment, in case of rainfall, rainwater runs from the upper surface of the photovoltaic module 41 to the drain ditch 61 and then from the drain ditch 61 to the upper surface of the photovoltaic module 41 of another roofing tile adjacent in the eaves side. Hence, normally, no rainwater enters the recess 25 of the roofing tile main body 21.

However, when the roofing tile is exposed to sunbeams or wind and rain for a long time, and the gasket 64 degrades, rainwater may enter the recess 25 through the degraded portion. In this case, the rainwater that has entered the recess 25 is easily discharged through the drain ditch 61 having almost the same length as that of the front hang portion 2d of the roofing tile main body 21. Hence, rainwater can be suppressed from running toward a terminal box storing recess 27.

In addition, since the drain ditch 61 is formed virtually in correspondence with the full width of the recess 25, the drain ditch 61 is not completely jammed with dust or the like. Hence, the drainage reliability is high, and the drainage performance for discharging rainwater that has entered the gap between the roofing tile main body 21 and the photovoltaic module 41 to the eaves side can be maintained for a long period.

In the second embodiment, the stopper portions 62 may be removed. In this case, the length of the single drain ditch 61 can be made almost equal to the full width of the recess 25, i.e., almost equal to the width of the photovoltaic module 41.

Figure 10:
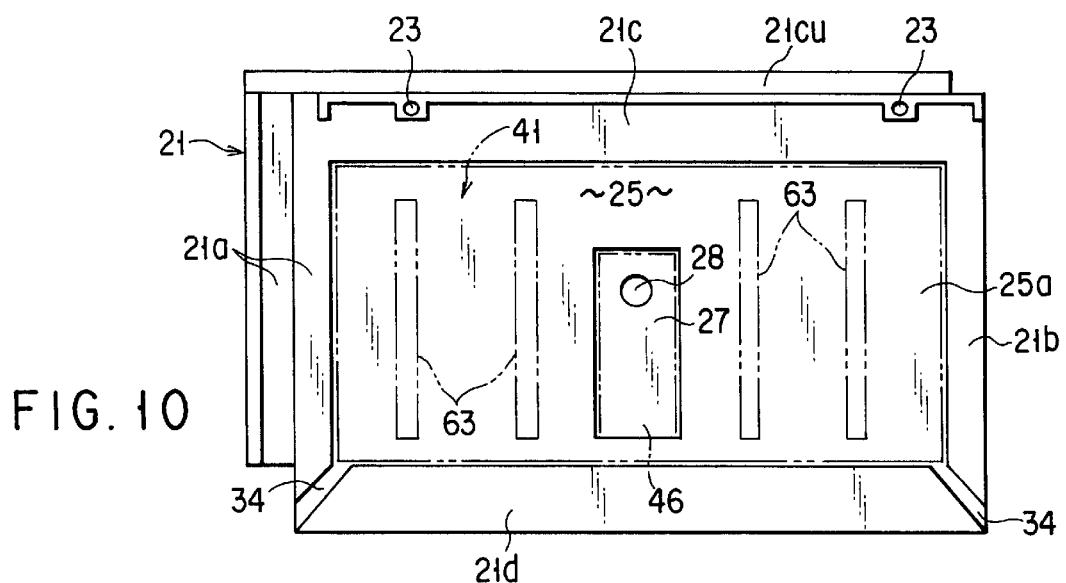
FIG. 10 is a plan view showing the roofing tile main body of a roofing tile according to the third embodiment of the present invention.
Figure 11:
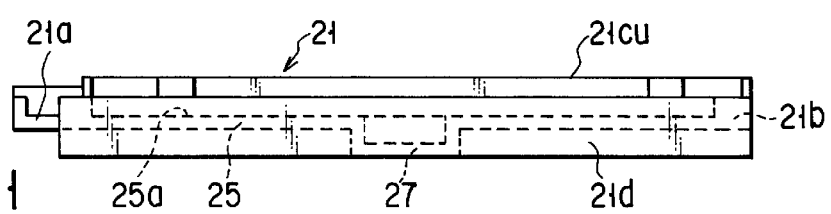
FIG. 11 is a front view of the roofing tile according to third embodiment.

FIGS. 10 and 11 are plan and front views showing the roofing tile main body of a roofing tile according to the third embodiment of the present invention. The third embodiment basically has the same arrangement as in the second embodiment. The same reference numerals as in the second embodiment denote the same parts in the third embodiment, and a detailed description of the arrangement and function will be omitted. The different points will be described below. The third embodiment is different from the second embodiment in the drain ditch, front hang portion, and the like.

In the third embodiment, the upper-side portion of a front hang portion 21*d* is continuously formed without being divided at the longitudinal-direction intermediate portion. A pair of drain ditches 34 directly communicate with lower corner portions 25*b* of a recess 25, respectively. The drain ditches 34 obliquely extend outward from the lower corner portions 25*b* and cross the front hang portion 21*d*. The upper-side portion of the two end portions of the front hang portion 21*d* and the eaves-side end portions of overlap portions 21*a* and 21*b* are separated. Except the above-described points, the third embodiment has the same arrangement as that of the second embodiment, including structures not shown in FIGS. 10 and 11.

In the arrangement of the roofing tile according to the third embodiment as well, the gasket (not shown) may degrade during use for a long time, and rainwater may enter the recess 25 through the degraded portion. In this case, the rainwater that has entered the recess 25 is discharged to the eaves side through the pair of drain ditches 34 of the roofing tile main body 21. Hence, the rainwater can be suppressed from running toward a terminal box storing recess 27.

Figure 12:
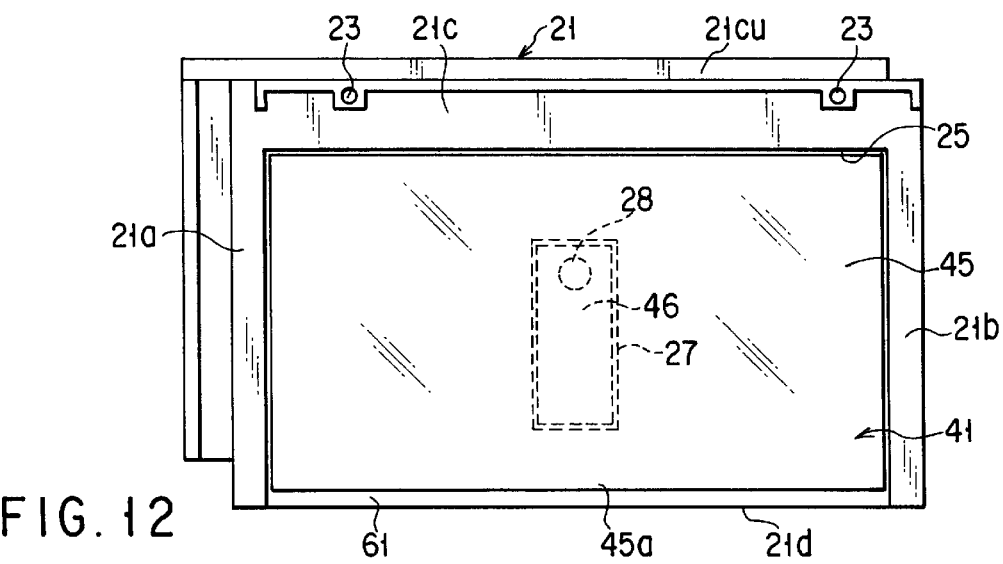
FIG. 12 is a plan view showing the roofing tile main body of a roofing tile according to the fourth embodiment of the present invention.
Figure 13:
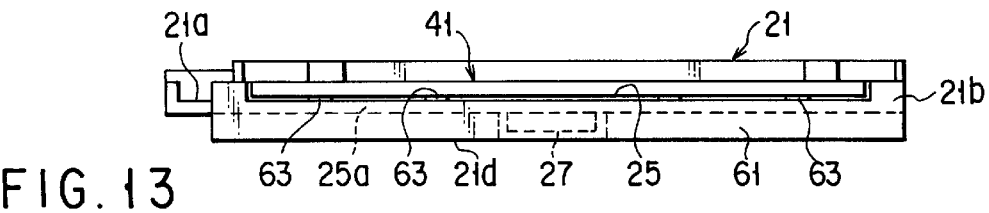
FIG. 13 is a front view of the roofing tile according to the fourth embodiment.

FIGS. 12 and 13 are views showing a roofing tile according to the fourth embodiment of the present invention. The fourth embodiment basically has the same arrangement as in the second embodiment. The same reference numerals as in the second embodiment denote the same parts in the fourth embodiment, and a detailed description of the arrangement and function will be omitted. The different points will be described below. The fourth embodiment is different from the second embodiment in the drain ditch length, the photovoltaic module size, and the like.

In the fourth embodiment, the width of a single drain ditch 65 formed at a front hang portion 21*d* of a roofing tile main body 21 is the same as the horizontal-direction width of a recess 25. The present invention is not limited to this, and the width of the drain ditch 65 may be larger than the width of the recess 25. The bottom surface of the drain ditch 65 continues to the bottom surface of the recess 25 almost without forming any step and bent downward, as in the second embodiment.

The size (depth direction) of a photovoltaic module 41 stored in the recess 25 is larger than that of the module 41 of the second embodiment. A lower edge portion 41*a* of the photovoltaic module 41 opposes and covers the most part of the drain ditch 65 from the upper side. Hence, the photovoltaic module 41 of the fourth embodiment is larger than that of the second embodiment.

Except the above-described points, the fourth embodiment has the same arrangement as that of the second embodiment, including structures not shown in FIGS. 12 and 13.

In the arrangement of the roofing tile according to the fourth embodiment as well, the gasket (not shown) may degrade during use for a long time, and rainwater may enter the recess 25 through the degraded portion. In this case, the rainwater that has entered the recess 25 is discharged to the eaves side through the drain ditch 65 which is hardly jammed with dust. Hence, the rainwater can be suppressed from running toward a terminal box storing recess 27. Additionally, since the photovoltaic module 41 having a large power generation area can be used, the power generation efficiency can be improved.

FIGS. 14 to 22 are views showing a power generation roofing tile according to the fifth embodiment of the present invention. The fifth embodiment basically has the same arrangement as in the first embodiment. The same reference numerals as in the first embodiment denote the same parts in the fifth embodiment, and a detailed description of the arrangement and function will be omitted. The different points will be described below. The fifth embodiment is different from the first embodiment in the water discharge portion, the means for fixing a photovoltaic module to a recess, and the structure of the bottom surface of the recess for efficient drainage of the recess, and the like.

Figure 14:
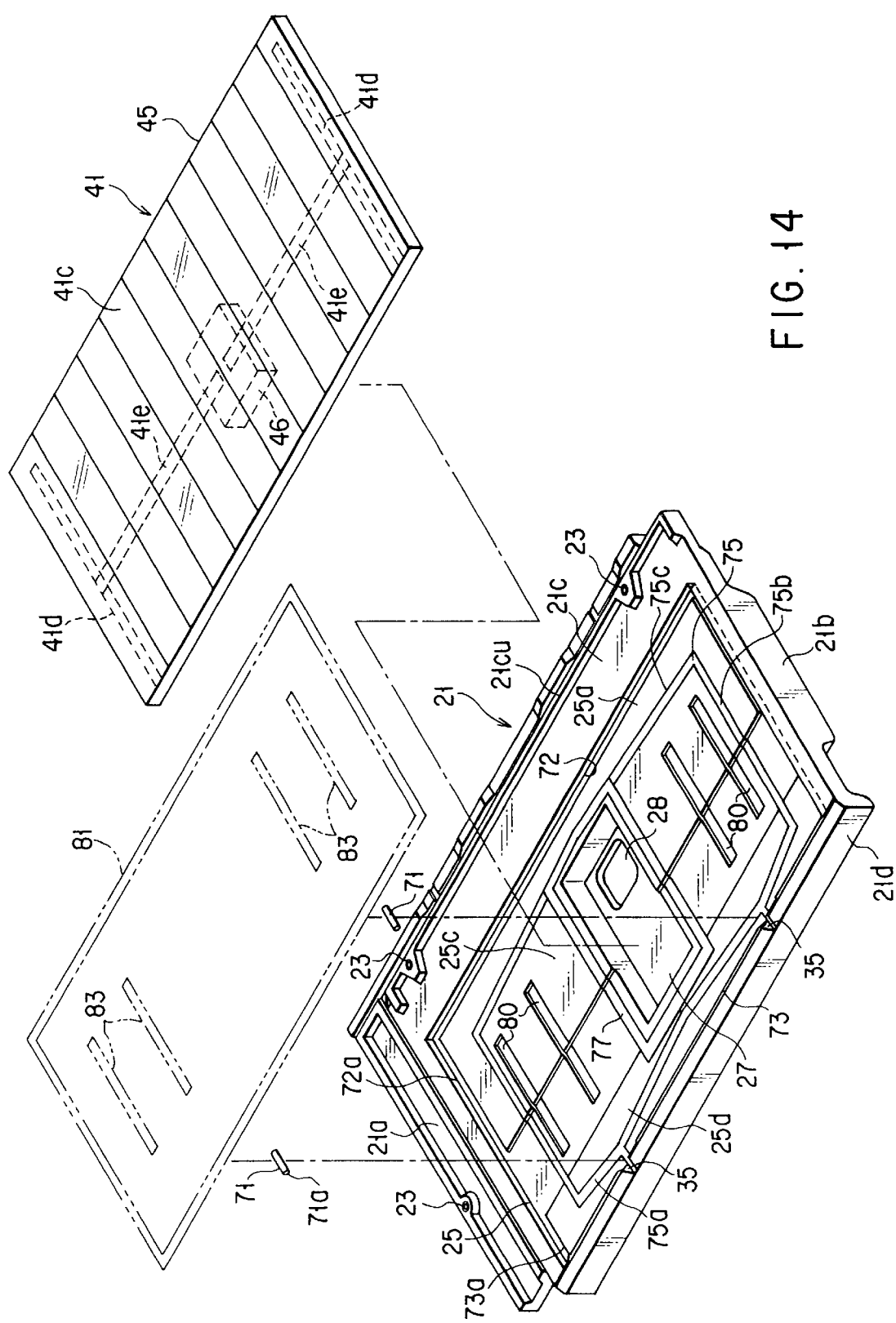
FIG. 14 is an exploded perspective view showing a roofing e according to the fifth embodiment of the present invention.

Referring to FIG. 14, reference numerals 41*a* to 41*c* denote constituent members of the module main body. These members have already been described in the first embodiment. Reference numeral 41*c* denotes a transparent glass substrate; 41*d*, electrodes; and 41*e*, an output extraction line.

Figures 15, 16:
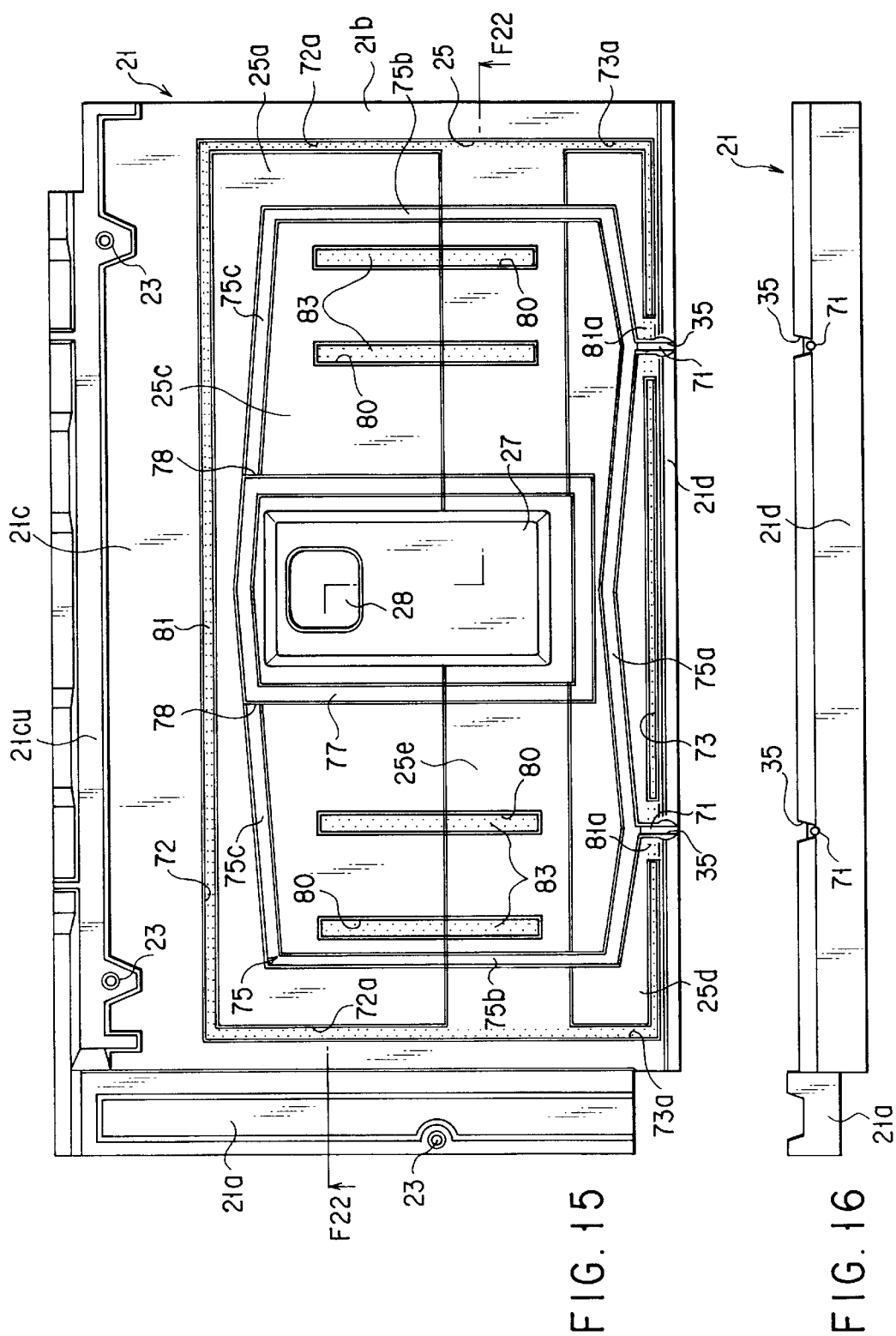
FIG. 15 is a plan view showing the roofing tile main body of the roofing tile according to the fifth embodiment.
FIG. 16 is a front view showing the roofing tile main body of the roofing tile according to the fifth embodiment.
Figure 17:
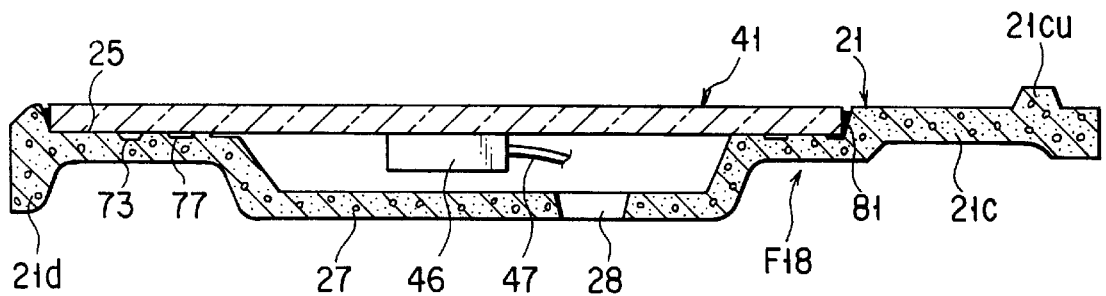
FIG. 17 is a sectional view of the roofing tile according to the fifth embodiment.
Figure 18:
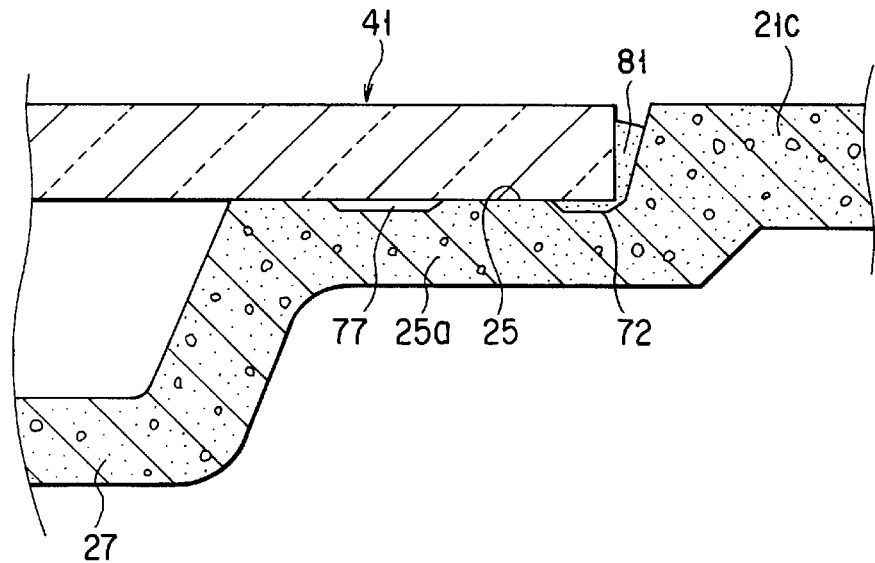
FIG. 18 is an enlarged sectional view showing a portion F18 shown in FIG. 17.
Figure 20:
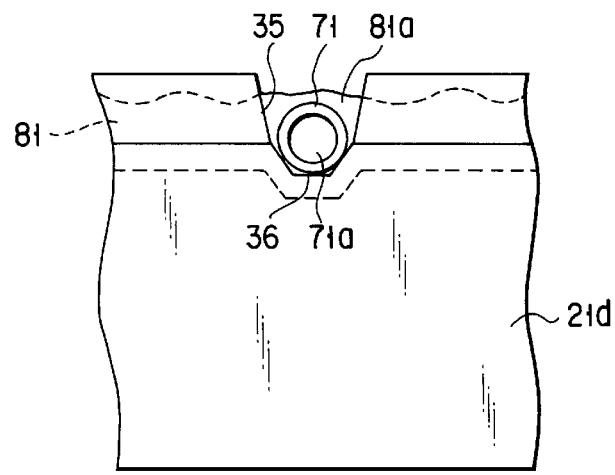
FIG. 20 is a front view showing the drain ditch portion shown in FIG. 19 before a photovoltaic module is mounted.
Figure 21:
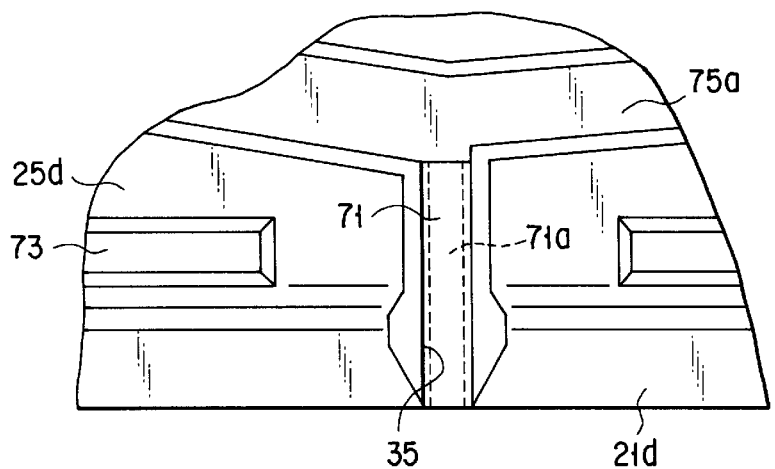
FIG. 21 is a plan view showing the drain ditch portion shown in FIG. 19 before a photovoltaic module is mounted.
Figure 22:
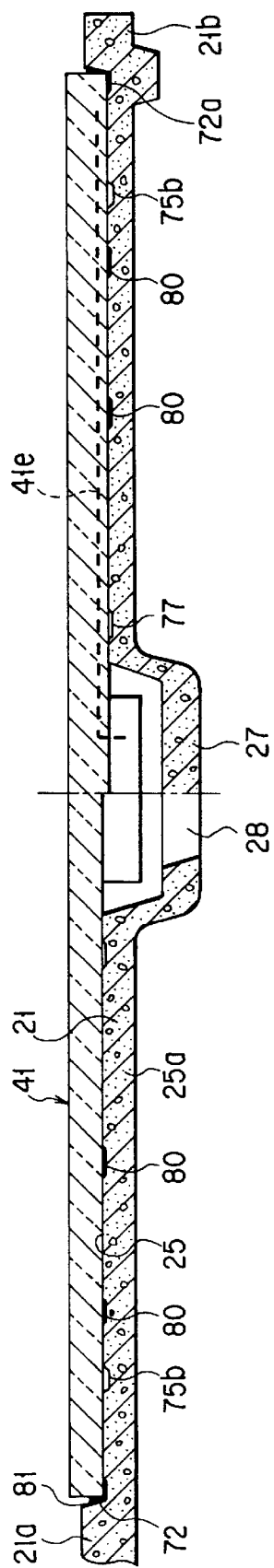
FIG. 22 is a sectional view showing the roofing tile according to the fifth embodiment, which is taken along a line F21—F21 in FIG. 15.

The two longitudinal-direction ends of a front hang portion 21*d* of a roofing tile main body 21 integrally continue to overlap portions 21*a* and 21*b*, respectively. The front hang portion 21*d* has a pair of drain ditches 35 crossing the front hang portion 21*d*. As shown in FIGS. 14, 16, and 20, each drain ditch 35 has its upper surface and two ends open. A bottom surface 36 of the ditch 35 is flush with the bottom surface of a recess 25. The eaves-side end is open to the front upper surface of the front hang portion 21*d* (the outer end face of the front hang portion 21*d*).

A thin pipe 71 is fitted on each drain ditch 35. The pipe 71 is obtained by cutting a plastic straw to a predetermined length. The inner hollow of the pipe 71 is used as a passage 71*a* communicating with the interior and exterior of the recess 25. Hence, the water discharge portion of the front hang portion 21*d* is basically formed from the tunnel-like passage 71*a*. With this water discharge portion, rainwater that has entered the recess 25 can be discharged from the passage 71*a* onto an eaves-side roofing tile 13 on which the front hang portion is placed.

The recess 25 has structures shown in FIGS. 14 to 18 and FIG. 22, as will be described below. These structures fix a photovoltaic module 41 and waterproofs a terminal box 46. These structures may be omitted except the catchment ditch to be described later.

The recess 25 has, on its bottom surface, an upper edging ditch 72 and lower edging ditch 73, which are spaced apart from each other in the vertical direction. The upper edging ditch 72 is continuously formed along the upper portions of an upper edge portion 21*c* and overlap portions 21*a* and 21*b*. The lower edging ditch 73 is continuously formed along the lower portions of the front hang portion 21*d* and overlap portions 21*a* and 21*b*. The lower edging ditch 73 along the front hang portion 21*d* has discontinuous parts at the positions of the pair of drain ditches 35, as shown in FIG. 15. The drain ditches 35 and pipes 71 cross the discontinuous portions.

The bottom surface of the recess 25 has an upper inner portion 25*c*, lower inner portion 25*d*, and shallow recess 25*e* formed between the portions 25*c* and 25*d*. The upper inner portion 25*c* is surrounded by the upper edging ditch 72*f* from three directions. The lower inner portion 25*d* is surrounded by the lower edging ditch 73 from three directions. The recess 25*e* extends in the widthwise direction of the recess 25.

The ends of the recess 25e are flush with the bottom surfaces of ditch portions 72a and 73a of the upper edging ditch 72 and lower edging ditch 73 along the overlap portions 21a and 21b. The recess 25e receives the projecting portion on the lower surface of the photovoltaic module 41, which corresponds to the output extraction line 41e. The box storing recess 27 is formed across the upper and lower inner portions 25c and 25d and divides the recess 25e into left and right portions.

The bottom surface of the recess 25 has a catchment ditch 75. This ditch 75 has a lower ditch portion 75a and side ditch portions 75b communicating with its two ends. The lower ditch portion 75a extends in the widthwise direction of the roofing tile main body 21. This ditch portion 75a is located in the lower inner portion 25d and is slightly shorter than that. The lower inner portion 25d has two portions moderately tilted toward the drain ditch 35 side, and the two portions individually communicate with the drain ditches 35.

The pair of side ditch portions 75b is formed across the upper and lower inner portions 25c and 25d so as to extend almost parallel to the overlap portions 21a and 21b while crossing the recess 25e. The catchment ditch 75 has an upper ditch portion 75c bent from the two side ditch portions 75b toward the terminal box storing recess 27. Hence, the catchment ditch 75 almost continuously surrounds the box storing recess 27.

The bottom surface of the recess 25 has an annular ditch 77 located inside the catchment ditch 75. This ditch 77 continuously surrounds the box storing recess 27. The upper ditch portion 75c is connected to the two ends of the upper end portion of the annular ditch 77. Partitions 78 are formed at the connection portions. Rainwater may be blown into the catchment ditch 75 through the drain ditches 35. The partitions 78 prevent the blown rainwater from running back to the annular ditch 77 and finally reaching the box storing recess 27. At least one adhesive ditch 80 is formed on the bottom surface of the recess 25 at a portion surrounded by the catchment ditch 75. More specifically, two adhesive ditches 80 are formed in each of a region between the overlap portion 21a and the box storing recess 27 and a region between the overlap portion 21b and the box storing recess 27. These adhesive ditches 80 extend in the vertical direction (eaves-ridge direction) across the upper inner portion 25c and recess 25e.

The photovoltaic module 41 is stored and fixed in the recess 25 having the above structure by the following way. Reference numeral 81 denotes a sealing material used as a waterproofing means. This sealing material 81 continuously annularly fills the entire periphery of the recess 25. The sealing material 81 crosses the two ends of the recess 25e at portions along the overlap portions 21a and 21b. The annularly coated sealing material 81 bonds the entire peripheral portion of the reverse surface of the photovoltaic module 41 stored in the recess 25. In addition, a part 81a of the sealing material 81 covers the upper surface of the pipe 71 to bond the pipe 71 to the inner surface of the drain ditch 35, as shown in FIG. 20.

As the sealing material 81, a silicone- or silicon-based sealing material that maintains elasticity even after hardening is used. Especially, a polyisobutylene-based sealing material containing silicon is preferably used because it does not contaminate the surfaces of the roofing tile main body 21 and photovoltaic module 41.

Coating of the sealing material 81 and setting of the pipe 71 are done in the following way. First, a pipe 71 longer than the drain ditch 35 is prepared, and one end portion of the pipe 71 is fitted in the drain ditch 35. In this case, the pipe 71 is fitted such that its end portion is located at the eaves-side ditch portion (lower ditch portion 75a) of the catchment ditch 75. When the pipe 71 is completely fitted, the other end portion of the pipe 71 projects from the drain ditch 35, as indicated by the alternate long and two dashed line in FIG. 19.

Next, the sealing material 81 is applied around the recess 25 manually or using an automatic machine. The width of the recess 25 coated with the sealing material 81 is almost the same as the width of the edging ditches 72 and 73. For this reason, the applied sealing material 81 crosses the upper side portion of the drain ditch 35.

Figure 19:
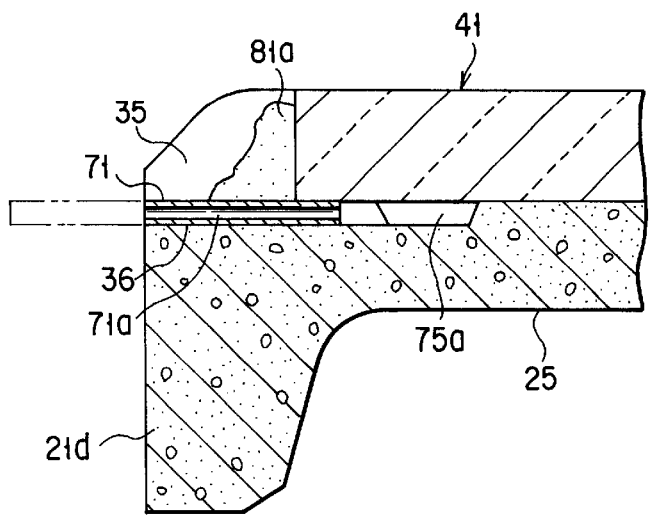
FIG. 19 is a sectional view showing the drain ditch portion of the roofing tile according to the fifth embodiment.

Finally, after an adhesive (to be described later) is applied, the photovoltaic module 41 is stored in the recess 25. After or before the sealing material 81 holds its shape, the projecting portion of the pipe 71 indicated by the alternate long and two dashed line in FIG. 19 is cut by a cutter. With the above procedure, the pipe 71 is mounted in the drain ditch 35.

The tunnel-like passage may be formed in the front hang portion 21d by employing the following method, instead of leaving the pipe 71 in the drain ditch 35. First, a spacer shaft formed from a pipe or shaft longer than the drain ditch 35 is prepared. Gel-like oil is coated on the outer periphery of one end portion of the spacer shaft. This end portion with oil is fitted in the drain ditch 35. Next, the sealing material 81 is applied around the recess 25 manually or using an automatic machine. After that, the photovoltaic module 41 is stored in the recess 25. Finally, after the sealing material 81 holds its shape, the spacer shaft is removed. With the above procedure, a tunnel-like passage conforming to the shape of the spacer shaft is formed between the drain ditch 35 and the drain ditch cross portion of the sealing material 81.

As described above, since the sealing material 81 is continuously annularly applied, the operation of coating the sealing material 81 need not be interrupted at the drain ditch 35. Hence, the sealing material 81 can be applied in a short time without any error, and the coating operability is high.

Each of the adhesive ditches 80 is filled with an adhesive 83. The reverse surface of the photovoltaic module 41 stored in the recess 25 is bonded to the bottom surface of the recess 25 by the adhesive 83 at a plurality of portions. The bonding performance of the adhesive 83 is higher than that of the sealing material 81. As the adhesive 83, an epoxy-based adhesive that maintains its elasticity in the bonded state after the start of use is preferably used. Instead, an adhesive that hardens in the bonded state after the start of use may be used.

As described above, the photovoltaic module 41 is bonded using both the sealing material 81 having an adhesion and the adhesive 83 having a higher bonding strength. For this reason, the photovoltaic module 41 can be firmly fixed to the recess 25.

The slightly projecting portion which covers the output extraction line 41e on the reverse surface of the photovoltaic module 41 is stored in the recess 25e. For this reason, the photovoltaic module 41 is arranged in an appropriate posture without being slightly tilted from the projecting portion as a fulcrum. Since the flat reverse surface of the photovoltaic module 41 comes into surface contact with the upper and lower inner portions 25c and 25d, the degree of contact by the sealing material 81 and adhesive 83 readily becomes uniform for the respective portions. Hence, the sealing material 81 can exhibit desired sealing performance and adhesion around the recess 25. Similarly, the adhesive 83 can exhibit desired adhesion on the lower surface of the photovoltaic module 41.

Except the above-described points, the fifth embodiment has the same arrangement as that of the first embodiment.

According to the roofing tile 13 having the above structure, normally, no rainwater enters the recess 25 of the roofing tile main body 21 due to the sealing function of the sealing material 81 which is continuously annularly coated.

However, rainwater may enter the recess 25 due to an error in sealing operation or degradation in sealing material 81. In this case, the rainwater that has entered the recess 25 is discharged in the eaves direction through the pipes 71 as lining on the drain ditches 35.

More specifically, although the eaves-side portion of the sealing material 81 crosses the drain ditches 35, the pipes 71 are fitted in the drain ditches 35, and the tunnel-like passages 71a of the pipes 71 are not closed by the sealing material 81. Even when the overlap space between the roofing tile main bodies 21 which are adjacent in the eaves-ridge direction and overlap in the vertical direction is jammed with dust, the drain ditches 35 and pipes 71 are located on the upper side of the jammed portion. Hence, even when rainwater enters the recess 25, the rainwater can be reliably discharged from the recess 25 through the tunnel-like passages 71a. With this drainage performance, the rainwater that has entered the recess 25 can be prevented from running toward the terminal box 46. Accordingly, electrical short circuit or earth leakage in the terminal box 46 can be prevented.

The rainwater that has entered the recess 25 and will run toward the terminal box 46 is gathered by the catchment ditch 75 provided on the bottom surface of the recess 25 and guided downward along the ditch 75. For this reason, the rainwater running downward through the catchment ditch 75 can be easily discharged from the recess 25 through the pipes 71 in the drain ditches 35 communicating with the lower side of the catchment ditch 75.

The adhesive 83 that mainly bonds the photovoltaic module 41 to the recess 25 linearly extends in the vertical direction. For this reason, the adhesive 83 is used as a levee. That is, the rainwater that has entered the recess 25 from the sides of the overlap portions 21a and 21b can be prevented by the adhesive 83 from reaching the box storing recess 27.

Each adhesive 83 is provided in the internal region surrounded by the catchment ditch 75. For this reason, the adhesive 83 can be prevented from being exposed to the rainwater that has entered the recess 25 by the rainwater guiding function of the catchment ditch 75 to the above-described drain ditches 35. Hence, degradation in adhesive 83 is suppressed, and stable bonding performance is sustained for a long time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A roofing tile which is used as a roofing material for a building and performs solar-light power generation, comprising:
    a roofing tile main body set tilted on a roof and having a recess, which is open upward and is formed in said roofing tile main body, and at least one water discharge portion formed at an eaves-side edge portion of said roofing tile main body while crossing the edge portion and communicating with the recess; and
    a photovoltaic module stored in the recess and fixed to said roofing tile main body.

2. A roofing tile according to claim 1, wherein the water discharge portion is formed from a ditch.

3. A roofing tile according to claim 2, wherein
    the eaves-side edge portion has a pair of stopper portions holding lower corner portions of said photovoltaic module,
    the drain ditch is formed between the stopper portions, and
    the drain ditch has a length slightly smaller than a widthwise size of the recess.

4. A roofing tile according to claim 2, wherein
    the drain ditch is formed from a single ditch,
    a width of the drain ditch is not less than a widthwise size of the recess, and
    the recess and the drain ditch are continuous.

5. A roofing tile according to claim 2, wherein the drain ditch communicates with lower corner portions of the recess.

6. A roofing tile according to claim 2, wherein a level of a bottom surface of the drain ditch is not more than that of a bottom surface of the recess.

7. A roofing tile according to claim 1, wherein the water discharge portion is formed from a tunnel-like passage.

8. A roofing tile according to claim 7, wherein
    said roofing tile further comprises a sealing material continuously provided around the recess to bond a peripheral portion of said photovoltaic module to the recess, and
    the passage is formed between the water discharge portion and a portion of the sealing material that crosses the water discharge portion.

9. A roofing tile according to claim 8, wherein the passage is formed from an inner hollow of a pipe having two open ends, the pipe being arranged between the sealing material and the water discharge portion.

10. A roofing tile according to claim 7, wherein said roofing tile further comprises a catchment ditch having a lower ditch portion extending in a widthwise direction of said roofing tile main body, the lower ditch portion communicating with the passage.

11. A roofing tile according to claim 10, wherein the catchment ditch has a pair of side ditch portions connected to two ends of the ditch portion and extending in a ridge-side edge direction of said roofing tile main body.

12. A roofing tile according to claim 1, wherein the eaves-side of said water discharge portion is opened in an eaves direction.

13. A roofing tile which is used as a roofing material for a building and performs solar-light power generation, comprising:
    a roofing tile main body set tilted on a roof and having a recess, which is open upward and is formed in said roofing tile main body, at least one through hole extending through a bottom wall of the recess, and at least one water discharge portion formed at an eaves-side edge portion of said roofing tile main body while crossing the edge portion and communicating with the recess;
    a photovoltaic module stored in the recess and fixed to said roofing tile main body;
    a fixing jig having a first end portion having a bent piece overlapping an upper surface of an edge portion of said photovoltaic module and holding the edge portion of said module, and a second end portion to which a bolt extending through the through hole is fixed; and a nut detachably tightened on the bolt on a reverse side of said roofing tile main body.

14. A roofing tile according to claim 13, wherein the first end portion is holding an eaves-side edge portion of said photovoltaic module.

15. A roofing tile according to claim 13, further comprising a levee formed on the bottom surface of the recess so as to continuously surround a ridge side and left and right sides of the through hole.

16. A roofing tile according to claim 1 or 13, wherein said photovoltaic module has, on a reverse surface, a terminal box for extracting a power output from said module, and said roofing tile further comprises a terminal box storing recess formed on a bottom wall of the recess to store the box.

\* \* \* \* \*